Patented Jan. 9, 1934

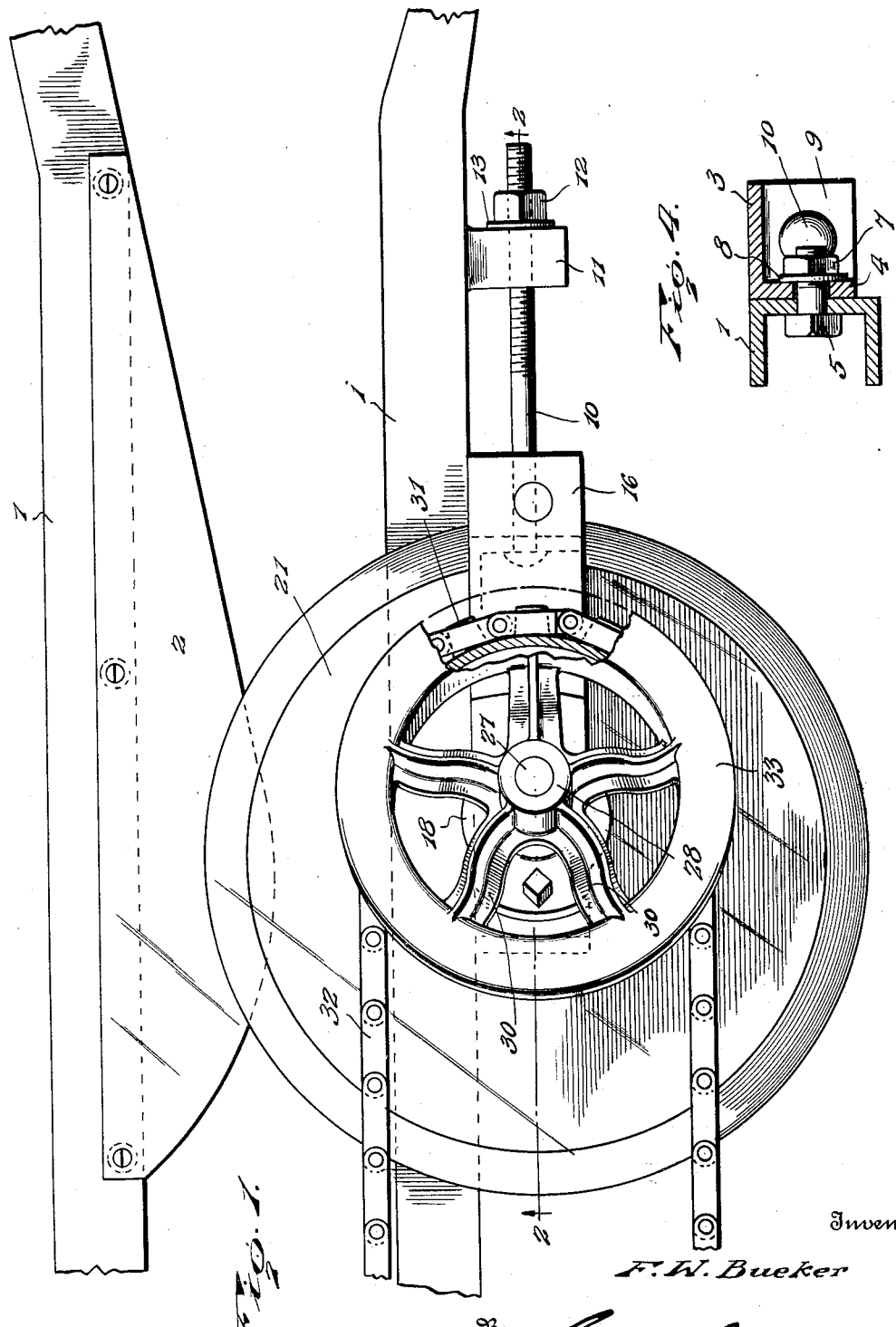

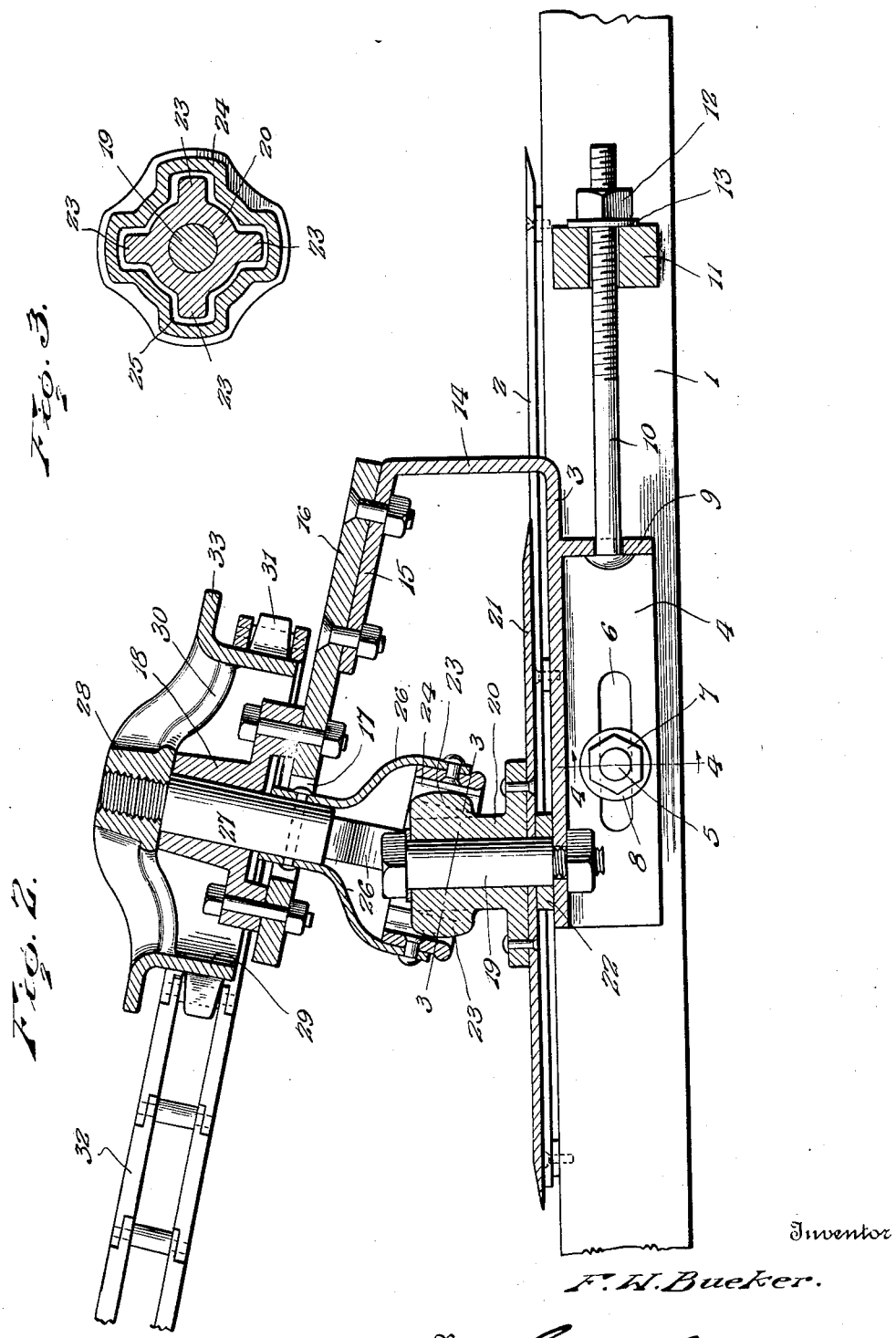

1,943,201

UNITED STATES PATENT OFFICE 1,943,201

CUTTER FOR CORN HARVESTERS

Frederick W. Bueker, Brookville, Kans.

Application February 3, 1932. Serial No. 590,719

6 Claims. (Cl. 56—102)

This invention relates to the cutting apparatus of corn-harvesters and has for its object the provision of a positively driven cutter which will effectually cut through the standing stalks and will reduce the draft of the machine in comparison with machines having the generally adopted stationary cutters. The invention seeks to provide a rotary cutter which will be positively operated and may be mounted upon any machine to be driven by one of the usual gathering chains. Incidental objects of the invention will appear in the course of the following description and the invention resides in certain novel features which will be particularly defined in the appended claims.

In the accompanying drawings, Fig. 1 is a plan view of my device in operative position, Fig. 2 is a longitudinal section on the line 2—2 of Fig. 1, Fig. 3 is a detail section on the line 3—3 of Fig. 2, Fig. 4 is a detail section on the line 4—4 of Fig. 2.

In the drawings, the reference numeral 1 indicates the usual upwardly diverging frame bars of a corn-harvester which, when the machine is in use, pass at opposite sides of the row of corn and guide the stalks into the cutting apparatus. 2 designates a stationary cutter which is secured upon one of the frame bars in the usual manner and may be of any approved form. Upon the cooperating frame bar 1, there is secured a bracket having a horizontally extending web 3 from one side edge of which depends a flange 4 which is adapted to bear against the outer side of the frame bar and is secured thereto by a bolt 5 passing through the frame bar and through a longitudinal slot 6 in the flange, a nut 7 being fitted upon the free end of the bolt and adapted to be turned home against a washer 8 which spans the slot, as will be understood upon reference to Figs. 2 and 4. When the nut is turned home, the bracket will be very firmly secured upon the frame bar and by loosening the nut slightly the bracket may be adjusted longitudinally in an obvious manner for a purpose which will presently appear. At the front end of the flange 4, there is a cross web 9 having an opening therethrough to receive the headed end of a long bolt 10 which extends forwardly and passes through a lug 11 formed on the side of the side bar 1 and equipped with a nut 12 and washer 13 at the forward side of said lug whereby the bolt may be secured therein, as will be understood. The head of the bolt bears against the rear side of the cross web 9 and, when the nut 7 is loosened, rotation of the nut 12 may draw the bolt 10 and the bracket forward so as to adjust the bracket to a desired set position. At the front end of the base member 3 of the bracket, there is an upturned portion or member 14 from the upper end of which a leaf 15 extends rearwardly and somewhat upwardly, as shown in Fig. 2. Secured upon the leaf 15 is a plate 16 through which, near the rear end thereof, is formed an opening 17 and secured upon the rear end portion of the plate 16, concentric with said opening, and extending over the same, is a bearing 18. A spindle or stationary shaft 19 is secured in the web 3 of the main bracket, near the rear end of said web, as shown in Fig. 2, and rises therefrom, and rotatably fitted upon said spindle is a hub 20 secured at its lower end to a circular cutting disk 21 which is of such diameter that its cutting edge will overlap the stationary knife 2, as shown in Fig. 1. Spacing washers 22 are fitted about the spindle 19, between the main bracket and the underside of the cutter, so that the cutter will be spaced above the frame bar of the harvester to properly cooperate with the stationary knife in an obvious manner. At the upper end of the hub 20, there are provided radially projecting equi-distant lugs or gear teeth 23 and encircling the upper end of the hub is an internal ring gear 24 having recesses 25 in which the gear teeth engage, as shown in Fig. 3, so that any rotation imparted to either the hub or the ring gear will be transmitted to the other engaging member. The ring gear is secured to and carried by a plurality of arms 26 which are secured thereto at their lower ends and at their upper ends are secured to the lower end of a shaft 27 which extends through and is rotatable in the bearing 18. The upper extremity of the shaft 27 is threaded to engage in the hub 28 of a sprocket wheel 29, the hub being connected with the periphery of the wheel by spokes 30 in the usual manner. The sprocket teeth 31 engage in the gathering chain 32 which is standard equipment upon corn-harvesters, and at the upper edge of the periphery of the wheel is formed a flange 33 which overhangs the chain and the sprocket teeth so that jumping of the chain from the teeth will be minimized. The hub 28 rests upon the upper end of the bearing 18 and transmits the rotation of the wheel to the shaft 27 which, in turn, causes rotation of the ring gear 24 whereby the motion is transmitted through the teeth 23 and hub 20 to the rotary cutter.

The machine is drawn over the field in the usual manner with the frame bars 1 passing at opposite sides of the row of stalks which are directed to the cutters in the usual manner. The gathering chain 32 rotates the sprocket wheel 29 in such direction that the forward side thereof moves toward the stationary knife and, of course, the rotating cutting disk moves in the same direction. The cutting disk will cut through the stalks cleanly and more easily than the stationary knives usually employed so that the draft of the machine will be very appreciably reduced. Should the chain become worn through long continued use, the nuts 7 and 12 may be manipulated so as to adjust the main holding bracket to maintain the chain in a taut condition and compensate for the wear. The device is very simple and may, therefore, be produced at a low cost and it may be readily applied to the frame of any existing corn-harvester as well as to the frames of corn-harvesters in the course of construction.

Having thus described the invention, I claim,

1. In a corn harvester, a frame, a stationary cutter secured to the frame, a rotary cutter mounted on the frame and coacting with the stationary cutter, means for adjusting the rotary cutter with respect to the stationary cutter and holding said rotary cutter in adjusted position, and means mounted on the frame above the rotary cutter for positively rotating the same.

2. In a corn harvester, a frame including spaced diverging bars, a stationary cutter secured to one of said bars, a rotatable cutter disk mounted on the other bar and coacting with the stationary cutter, means for adjusting the rotary cutter disk with respect to the stationary cutter and holding said disk in adjusted position, a driving shaft disposed above the disk, and a universal joint connection between the disk and said shaft.

3. A corn cutter comprising a rotatable disk, a bracket carrying the disk, means for securing the bracket upon the frame of a corn-harvester and adjusting it longitudinally upon the frame, a bearing supported by the bracket above the disk, a shaft mounted in said bearing, means for rotating said shaft, and a universal connection between said shaft and the cutter disk.

4. A corn cutter comprising a bracket having a depending web provided with a longitudinal slot and a cross web at the front end of said depending web, a securing bolt passed through the slot and a frame bar, a projection on the frame bar at the front of the bracket, a long bolt fitted to the cross web of the bracket and passing through said projection, a nut on the front end of the bolt bearing against said projection, a rotary cutter carried by the bracket, and means supported by the bracket above the cutter for rotating the cutter.

5. A corn cutter comprising a bracket, a spindle carried by the bracket, a hub rotatably fitted on the spindle, a cutter disk secured to the hub, a shaft supported by the bracket above the spindle, a ring gear carried by said shaft and encircling and engaging the hub, and means for rotating said shaft.

6. A corn cutter comprising a bracket having an upstanding portion at its front end, a leaf extending upwardly and rearwardly from the upper end of said upstanding portion, means for securing the bracket to a frame bar of a corn-harvester, a vertically disposed spindle carried by the bracket, a hub rotatably mounted on the spindle and provided with gear teeth at its upper end, a cutter disk secured to the lower end of said hub, a plate secured upon the leaf and extending rearwardly beyond the same and provided with an opening near its rear end, a bearing secured upon said plate concentric with said opening, a shaft extending through said bearing, arms secured to and depending from the lower end of the shaft, a ring gear carried by the lower ends of said arms and encircling and engaged with the hub, a gear wheel connected to the upper end of the shaft, and means for rotating said wheel.

FREDERICK W. BUEKER. [L..S]